United States Patent [19]
Kao et al.

[11] Patent Number: 5,283,575
[45] Date of Patent: Feb. 1, 1994

[54] SYSTEM AND METHOD FOR LOCATING A TRAVELLING VEHICLE

[75] Inventors: Wei-Wen Kao, Freemont; Liang-Jong Huang, Berkeley, both of Calif.

[73] Assignees: Zexel Corporation; Daihatsu-Nissay, both of Tokyo, Japan

[21] Appl. No.: 789,287

[22] Filed: Nov. 8, 1991

[51] Int. Cl.$^5$ .................................................. G08G 1/123
[52] U.S. Cl. ................................... 340/990; 340/988; 340/995; 364/424.01; 364/449; 364/443; 73/178 R
[58] Field of Search ............... 340/990, 988, 995; 364/424.01, 449, 443, 444, 450, 451; 73/178 R

[56] References Cited
U.S. PATENT DOCUMENTS

| | | | |
|---|---|---|---|
| 4,796,189 | 1/1989 | Nakayama et al. | 340/990 |
| 4,924,402 | 5/1990 | Ando et al. | 364/449 |
| 4,989,151 | 1/1991 | Nuimura | 340/990 |
| 5,023,798 | 6/1991 | Neukirchner et al. | 340/995 |
| 5,060,162 | 10/1991 | Ueyama et al. | 340/988 |
| 5,101,351 | 3/1992 | Hattori | 180/167 |

OTHER PUBLICATIONS

IEEE Spectrum, "Fuzzy fundamentals", pp. 58–60, Oct. 1992.

*Primary Examiner*—Donnie L. Crosland
*Attorney, Agent, or Firm*—Thomas R. Morrison

[57] ABSTRACT

A vehicle navigation system helps locate the vehicle on a road network by overcoming, through the use of fuzzy logic, the errors of positioning sensors and routing computers. In the system, sensors continually feed position coordinates to a processing unit that traces the vehicle's path in a road database. Fuzzy logic-based reasoning is used to determine the most probable location of the vehicle, whether off- or on-road, thereby correcting errors in its raw path as sensed or computed.

4 Claims, 4 Drawing Sheets

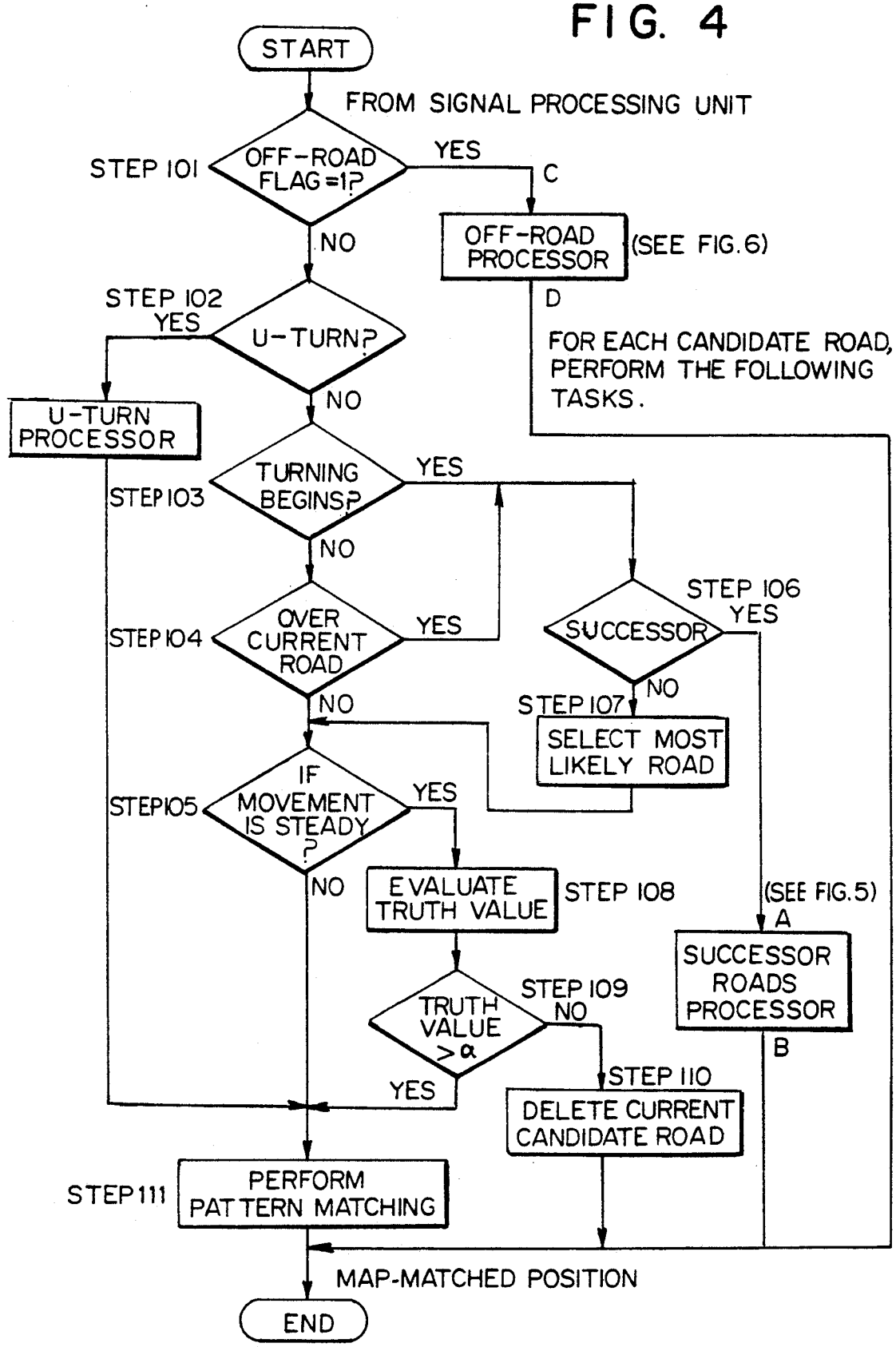

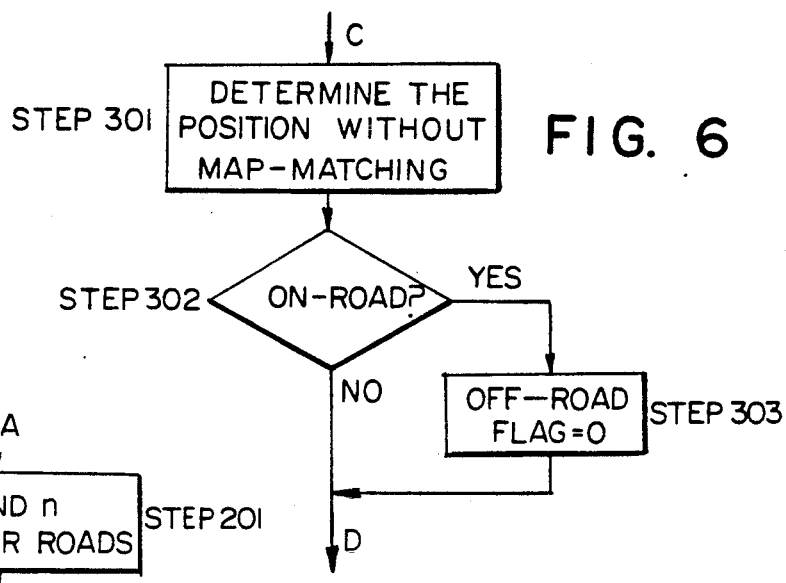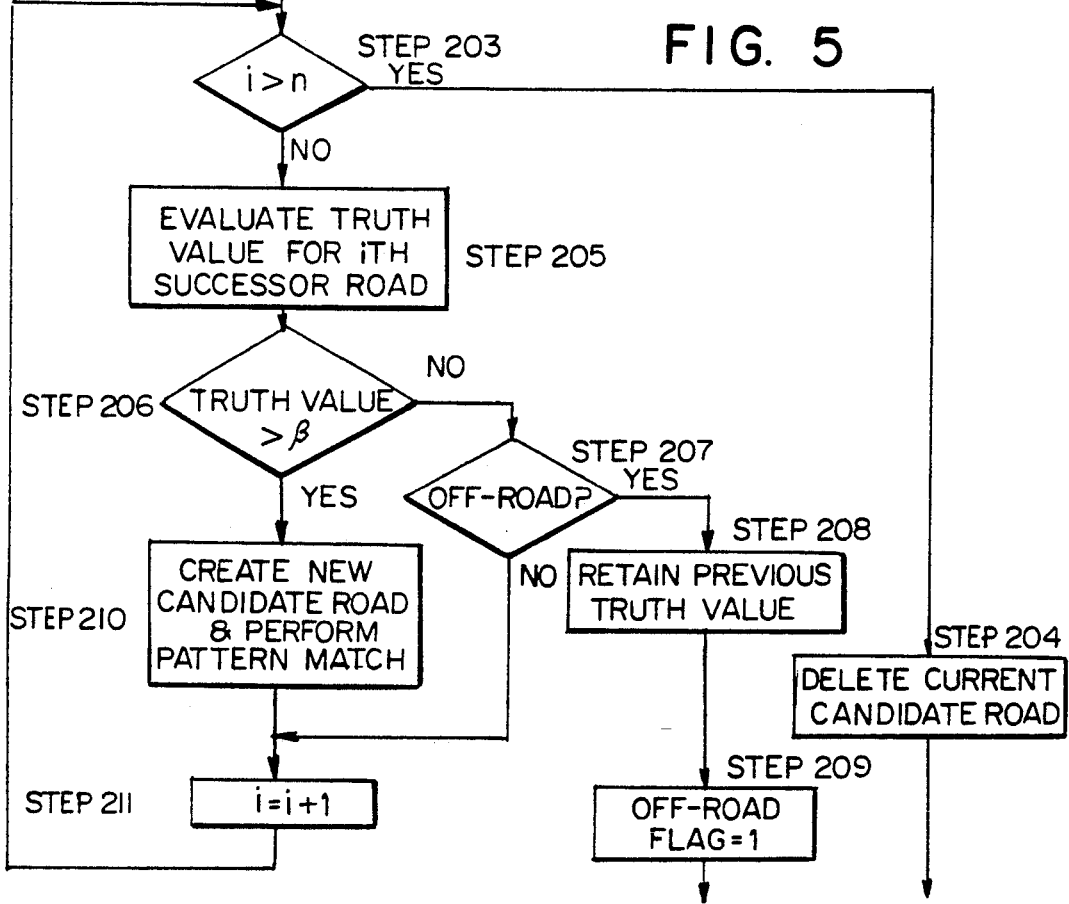

SYSTEM AND METHOD FOR LOCATING A TRAVELLING VEHICLE

BACKGROUND OF THE INVENTION

This invention relates to a system for locating a vehicle and guiding it along its route, in which the vehicle's position in an area represented by a digitized map database is continuously determined. Since navigation and route guidance decisions are based on this continuously-determined position, it is necessary that the position be determined accurately.

In known vehicle navigation systems, a vehicle's position is continuously determined in relative or absolute X-Y coordinates. This position determination is absolute, if determined, for example, by GPS (Global Positioning System) or Loran C, or relative, if determined by dead reckoning through the continuous integration of successive displacement vectors. However, the position so determined in either case is not always accurate. Because of errors in sensing and computation, the positions reported by the system may depart from actual vehicle positions. Thus a travel route as reported by the system may fail to match the roads delineated in the database.

Past attempts to match the travel route to a map make use of conventional pattern-matching to compare the vehicle's route with known roads close to the previous matched position. The road whose shape most closely approaches the previously matched road is selected as the one on which the vehicle must be traveling. Such a process takes considerable time if there are many roads and branches of roads in the area.

U.S. Pat. No. 4,963,864 discloses another method, where pattern matching is performed for only a limited number of roads, thereby reducing the time required. A road is selected if the angle between the vector of current motion, as determined by GPS, Loran C, or dead reckoning, is within a predetermined value of the vector extending from the assumed current position. Pattern-matching between the road pattern selected and the vehicle's trajectory gives the position on the map, and the process is speeded up because only a limited number of roads is considered for matching. The computational load, although reduced, is still considerable, and the reduction in the number of roads considered may exclude the road on which the vehicle is actually located. Thus, the above methods fail to overcomes fully the drawbacks of incorrect positioning.

OBJECTS AND SUMMARY OF THE INVENTION

An object of the present invention is to provide a method for determining the path on a road map of a moving vehicle that overcomes the drawbacks of the prior art.

A further object of the present invention is to determine efficiently the path on a road map of a moving vehicle by selecting only a limited number of roads for pattern matching.

Still a further object of the present invention is to improve the efficiency of pattern matching of a vehicle travel path to a map by the use of fuzzy logic and approximate reasoning.

Briefly stated, the present invention provides a vehicle navigation system that helps locate the vehicle on a road network by overcoming, through the use of fuzzy logic, the errors of positioning sensors and routing computers. In the system, sensors continually feed position coordinates to a processing unit that traces the vehicle's path in a road database. Fuzzy logic-based reasoning is used to determine the most probable location of the vehicle, whether off- or on-road, thereby correcting errors in its raw path as sensed or computed.

According to an embodiment of the invention, there is provided a vehicle navigation system, which comprises: means for sensing a plurality of successive positions of the vehicle to create a sensed representation of a vehicle travel path, means for storing a map of roads in a vicinity of the vehicle, means for matching the sensed representation of a vehicle travel path with an actual vehicle travel path in the map, and the means for matching including fuzzy logic elements.

According to a feature of the invention, there is provided a method for locating a position of a vehicle comprising: sensing a plurality of successive positions of the vehicle to produce a stored representation of a vehicle travel path, comparing the stored representation with a plurality of vehicle travel paths in a map, the step of comparing including employing fuzzy logic to best match the stored representation with one of the plurality of vehicle travel paths, whereby errors in the step of sensing can be overcome, and determining an actual position of the vehicle from the best match.

According to a further feature of the invention there is provided a vehicle navigation system comprising: a plurality of positioning sensors to sense a plurality of successive positions of the vehicle, means for comparing the plurality of positions with a plurality of roads on a digitized map, fuzzy logic means for choosing a best fit between the plurality of positions and a one of the plurality of roads, and means, based on the best fit, for determining a vehicle present position on the one of the plurality of roads.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a flow chart of the program that matches the vehicle position to the map for the on-road case.

FIG. 5 is a flow chart of the subprogram that retrieves successor roads.

FIG. 6 is a flow chart of the subprogram that matches the vehicle position to the map for the off-road case.

DETAILED DESCRIPTION OF THE PREFERRED EMBODIMENT

Figure 1:
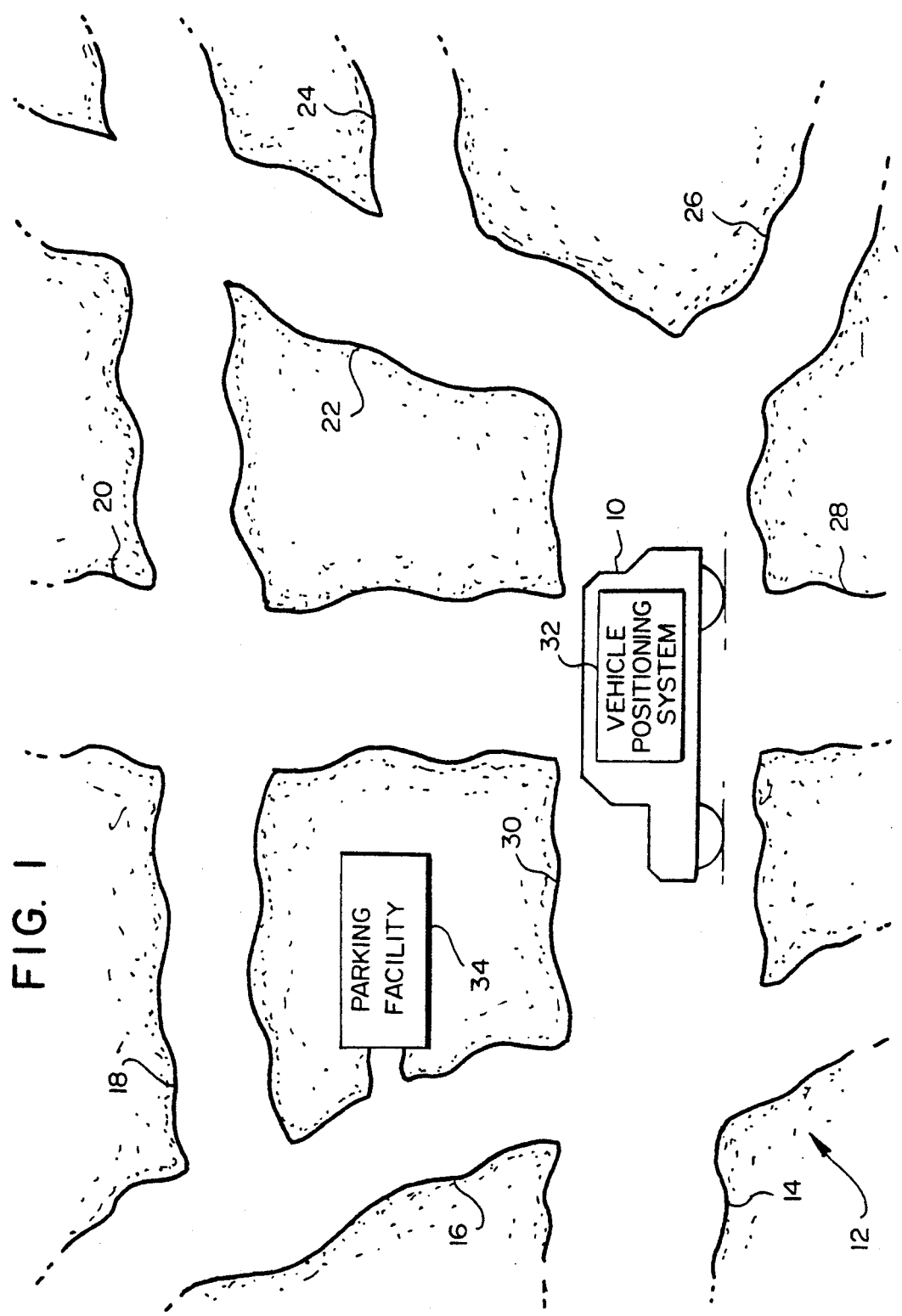
FIG. 1 is a simplified view of a vehicle provided with a vehicle positioning system moving over a road network whose map is stored digitally in a database.

Referring to FIG. 1, a vehicle 10 moves over a road network 12 consisting of a plurality of roads 14–30 which have been digitized into a map. Vehicle 10 is provided with a vehicle positioning system 32 capable of carrying out the method of this invention. Also within road network 12 are a plurality of off-road locations that have not been digitized, for example, a parking facility 34.

Figure 2:
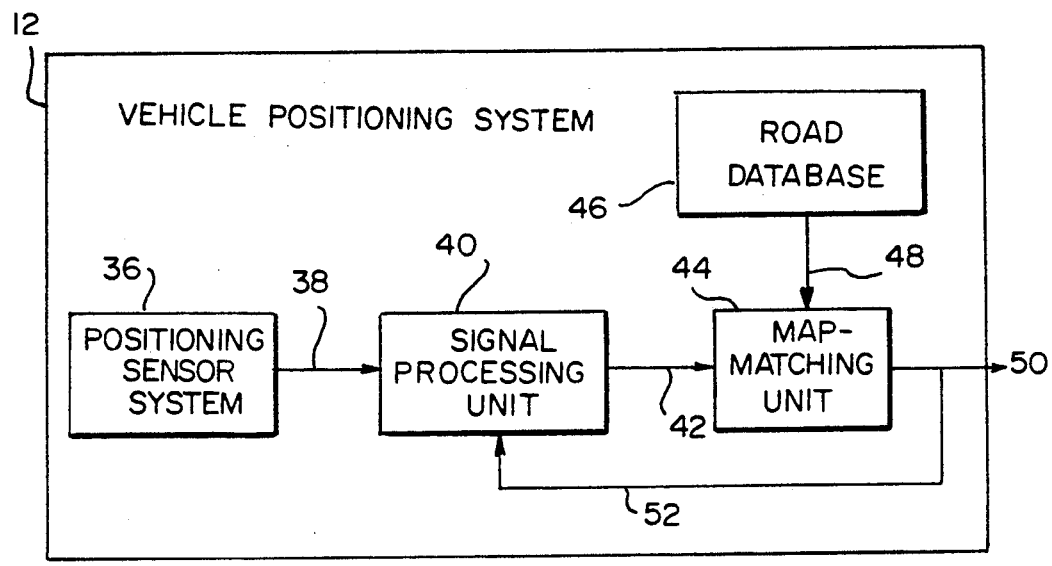
FIG. 2 is a block diagram of the vehicle positioning system.

Referring to FIG. 2, vehicle positioning system 32 is comprised of a positioning sensor system 36, a signal processing unit 40, and a map-matching unit 44. A raw position, which may be either relative or absolute, from positioning sensor system 36 is fed over a line 38 to signal processing unit 40, which converts the information to X-Y coordinates of successive positions occupied over time by vehicle 10. Signal processing unit 40 feeds the X-Y coordinates to map-matching unit 44 over a line 42.

The X-Y coordinates of the successive positions define a computed travel path over time. Though the computed travel path can in principle be matched to a road-following route in a road database 46 in practice errors from both positioning sensor system 36 and signal processing unit 40 make the shape of the computed travel path generally different from any route in road database 46. Therefore map-matching unit 44 must carry out a computer program to find the best fit of the computed travel path to the digitized map in road database 46.

Man-matching unit 44 uses a computer program, as shown in FIGS. 4, 5, and 6, to match the computed travel path to the digitized map in road database 46, received over a line 48. The match yields a signal 50 representing a map-matched position. Signal 50 may be fed back to signal processing unit 40 over line 52 to correct positioning errors.

Because of these errors, signal 50 is likely to be an inexact representation of the location of vehicle 10. Moreover, the prior art offers no means for choosing among a plurality of such inexact positions generated by signal processing unit 40. Therefore a means is required for correcting signal 50 to correspond with the precise location of vehicle 10. In this invention, fuzzy logic is employed to improve the accuracy of locating vehicle 10 precisely by establishing criteria of choice among a plurality of map-matched positions 50 drawn from the digitized maps in road database 46.

The computer program carried out in map-matching unit 44 determines by fuzzy logic which of the plurality of signals 50 is the most likely to be the precise location of vehicle 10. The process of this invention, taking place in vehicle positioning unit 32, for determining the best location for vehicle 10, uses a system of fuzzy logic to assign truth values to each one of the plurality of signals 50 and to choose among them based on the assigned truth value.

Figure 3:
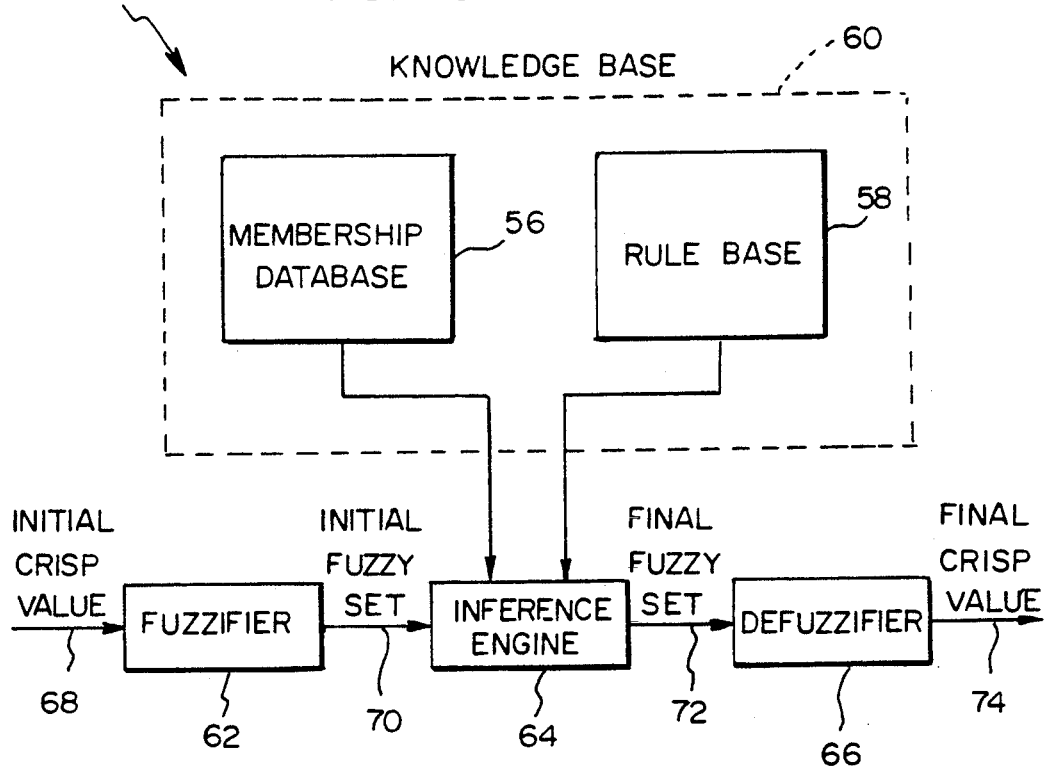
FIG. 3 is a block diagram of a fuzzy logic system as employed by this invention.

Referring to FIG. 3, one type of a fuzzy logic system 54 which may be used is composed of five principal units: a membership database 56 and a rule base 58, which are combined into a knowledge base 60; a fuzzifier 62; an inference engine 64; and a defuzzifier 66.

Fuzzifier 62 converts an initial crisp value 68, which is deterministic, into an initial fuzzy set 70 by a known fuzzification method. Initial fuzzy set 70 is a qualitative representation, characterized by a membership function, of initial crisp value 68. Inference engine 64 operates on initial fuzzy set 70, in accordance with rules of fuzzy reasoning from rule base 58 and membership functions of fuzzy sets kept in membership database 56, to transform by inference initial fuzzy set 70 into a resulting fuzzy set 72 which is also qualitative. Then defuzzifier 66 converts the outcome of the fuzzy reasoning process, resulting fuzzy set 72, into a crisp outcome value 74 which is also deterministic.

Referring to FIG. 4, an initial position of vehicle 10 is entered from signal processing unit 40. The initial position may be set by the operator, in which case it is assumed to be correct. If the operator sets the initial position, a candidate initial road is chosen uniquely from road database 46 if the vehicle is on-road.

The initial position may also be set by the positioning sensor system 36, in which case it may or may not be correct. In that case, selection of the candidate initial road requires a choice according to criteria, for example, "ANY road within the error range of the sensor is a candidate, IF the road's configuration resembles the vehicle's travel path." The choice is made by fuzzy logic, for example, assigning a qualitative truth value comparing a vehicle heading with the candidate road's direction according to the rule, drawn from rule base 58, that "IF the difference between the heading value and the direction value are small, THEN the truth value is high." In this example, "small" and "high" are qualitative terms defined by membership functions drawn from membership database 56. If the truth value of the candidate road is greater than a predetermined value, then the candidate road is chosen.

More than one rule or criterion may be applied at any step, for example, the distance between the vehicle position and the candidate road may be used. Where more than one rule is applied, the truth value is determined by combining the results from all rules that are applied.

If no candidate road is chosen, i.e., no road in road database 46 meets the criteria of choice, the off-road flag is set to 1 (Step 101) and the program branches at C to the off-road subprogram shown in FIG. 6. The off-road flag may also be set to 1 and branching take place in response to an operator's input of an off-road initial position. Control returns to the main program at D after the off-road subprogram finishes executing.

If the program in step 101 sets the off-road flag to 0, the vehicle is moving along the chosen road, and its further path must be delineated. In step 102 two consecutive positions of the vehicle are tested for a U-turn, again by fuzzy logic, for example, by applying the rule "IF the vehicle's heading has changed almost 180 degrees between successive positions, AND IF its motion is steady, AND IF its speed is reduced, THEN the probability of a U-turn is high," where "almost 180 degrees," "steady", and "high" are defined by membership functions. If in step 102 it is determined that the vehicle has made a U-turn, then the U-turn processor updates vehicle position information and sends it directly to step 111 for pattern matching.

If the vehicle has not made a U-turn, in step 103 the program checks whether or not the vehicle has begun another type of turn. This check can be carried out by either binary or fuzzy logic. If turning has not begun, in step 104 the program checks whether the vehicle is passing over the same road as was chosen to match its previous position.

If either step 103 or 104 returns a "yes", the program determines (step 106) whether or not to search for successor roads, which it does by fuzzy logic, for example, by applying the rule "IF the vehicle is in steady motion, AND IF the distance travelled along the chosen road is large compared to the chosen road's length, THEN the necessity to search for successor roads is high." If the conclusion is to search for successor roads, then the program branches at A to the subprogram shown in FIG. 5 that retrieves successor roads. (Control returns to the main program at B after the successor roads subprogram finishes executing.) If step 106 is performed and yields a "no", the program selects a most likely candidate road (step 107), based on the calculated path of travel.

A "no" from step 104 or a selection from step 107 leads to a check by fuzzy logic whether the vehicle's motion is steady (step 105), using a rule such as, "IF the root mean square errors of the vehicle's heading and speed are small, THEN the motion is steady." If motion is not steady, the program goes directly to step 111.

If motion is steady, the program evaluates by fuzzy logic the truth value of the correspondence between the vehicle travel path and the candidate road (step 108). The rule is of the form, "IF the truth value of the previous candidate road pattern is high, AND IF the truth value of the current candidate road pattern is high, THEN the truth value of the correspondence is high." Next, the truth value is tested against a predetermined value $\alpha$ (step 109). If the truth value is greater than $\alpha$, the program moves to step 111. If the truth value is less, the candidate road is deleted (step 110).

Finally, a pattern matching process that determines the current map-matched vehicle position in X-Y coordinates on the candidate road segment is performed (step 111) before the program terminates.

Referring to FIG. 5, the subprogram to find successor roads starts from point A on FIG. 4. All roads that connect to the particular end of the current candidate road towards which vehicle 10 is moving are retrieved from road database 46 (step 201). Next a counter is set to choose the first road retrieved (step 202), and the value in the counter is compared to the number of successor roads retrieved (step 203). If the counter holds a number greater than the number of successor roads retrieved, the process of retrieving successor roads is terminated (step 204), the current candidate road is deleted (step 205), and the subprogram reenters the main program at point B on FIG. 4.

If the counter holds a number less than or equal to the number of successor roads retrieved, the road whose number corresponds to the value of the counter is given a truth value (step 206) by fuzzy logic, using rules such as "IF the difference between the distance travelled along the current candidate road and the length of the candidate road is small, AND IF the difference between the vehicle heading and the orientation of the successor road is small, THEN the truth value of the successor road is high" and "IF the truth value of the candidate road is high AND IF the truth value of the successor road is high, THEN the combined truth value of the moving vehicle on the successor road is high."

Next the truth value determined for the successor road is compared to a predetermined value $\beta$ (step 207). If the value determined is less than $\beta$, the subprogram checks whether or not the vehicle is off-road, for example, in parking lot 34 (step 208), by fuzzy logic, using a rule such as "IF within a given distance no road pattern similar to the path of travel can be found, THEN the vehicle is off-road." If the result of step 208 is affirmative, the truth value is retained (step 209), the off-road flag is set to 1 (step 210), and the successor-road subprogram exits to the off-road subprogram in FIG. 6.

If the result of step 208 is negative, the subprogram goes to step 212 where the counter is incremented by one and the subprogram returned to step 203.

If the successor road's truth value is greater than $\beta$ in step 207, the successor road becomes the new candidate road and a pattern match is performed (step 211) before the counter is incremented and the subprogram returned to step 203.

Referring to FIG. 6, the off-road subprogram starts from point C on FIGS. 4 or 5. The program begins (step 301) by determining the vehicle's position, either by adding a relative displacement to the previous map-matched position or, if the position was determined absolutely, as, for example, from GPS, by displaying the output of signal processing unit 40. Then the subprogram checks (step 302) whether the vehicle may in fact be on-road. This check is made by fuzzy logic, using a rule, for example, "IF within a given distance there is more than one road pattern similar to the current vehicle motion, THEN the vehicle is on-road." The given distance may be defined as a function of: the truth value of the candidate road, the previous distance error between the calculated position from signal processing unit 40 and map-matched position 50, or the like. If the answer is affirmative, the off-road flag is set to 0 (step 303), and the subprogram terminates and returns control to the main program at D in FIG. 4.

Since the map-matching process is performed continually as vehicle 10 moves along its route, the truth value of candidate roads constantly decreases. When only one candidate road remains, the truth value of this road should be reset to one.

The result of the map-matching process shown in FIGS. 1-6 is a list of candidate roads, each of which has a different truth value. This truth value is a measure of the candidate road's resemblance to vehicle 10's travel path. The map matched position represented by signal 50 on the candidate road with the highest truth value is the likeliest position of vehicle 10 with reference to road database 46.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle navigation system, which comprises:
  means for sensing a plurality of successive positions of said vehicle to create a sensed representation of a vehicle travel path;
  means for storing a map of roads in a vicinity of said vehicle;
  means for defining an actual vehicle travel path in said map;
  means for matching said sensed representation of a vehicle travel path with said actual vehicle travel path; and
  said means for matching including a plurality of fuzzy logic elements;
  said fuzzy logic elements including:
    a fuzzifier receiving said plurality of successive positions, and effective to produce an initial fuzzy set;
    an inference engine receiving said initial fuzzy set, said map, and a set of inference rules and membership functions for producing a plurality of final fuzzy sets;
    a defuzzifier effective for producing a set of crisp values from said final fuzzy sets; and
    said crisp values being effective to determine a map-matched vehicle position.

2. A vehicle navigation system as in claim 1, wherein said means for sensing includes at least one of GPS, Loran C, and dead reckoning.

3. A method for locating a position of a vehicle comprising:

sensing a plurality of successive positions of said vehicle to produce a stored representation of a vehicle travel path;

comparing said stored representation with a plurality of vehicle travel paths in a map;

the step of comparing including employing fuzzy logic to match said stored representation with a one of said plurality of vehicle travel paths, whereby a best matching path is chosen; and determining an actual position of said vehicle from said best matching path.

4. A vehicle navigation system comprising:

a plurality of positioning sensors to sense a plurality of successive positions of said vehicle;

means for comparing said plurality of positions with a plurality of roads on a digitized map;

fuzzy logic means for choosing a best fit from among a plurality of fits between said plurality of positions and said plurality of roads; and means, based on said best fit, for determining a vehicle present position on a one of said plurality of roads.

* * * * *